United States Patent [19]
Nakamura

[11] Patent Number: 5,497,737
[45] Date of Patent: Mar. 12, 1996

[54] INTAKE AND EXHAUST VALVES CONTROL OF INTERNAL COMBUSTION ENGINE

[75] Inventor: Makoto Nakamura, Yokosuka, Japan

[73] Assignee: Nissan Motor Co., Ltd., Yokohama, Japan

[21] Appl. No.: 319,528

[22] Filed: Oct. 7, 1994

[30] Foreign Application Priority Data

Oct. 14, 1993 [JP] Japan .................................. 5-256580

[51] Int. Cl.$^6$ ............................... F01L 1/34; F02D 13/02
[52] U.S. Cl. .................................. 123/90.15; 123/90.16; 123/90.17
[58] Field of Search ........................... 123/90.15, 90.16, 123/90.17

[56] References Cited

U.S. PATENT DOCUMENTS

| | | | |
|---|---|---|---|
| 5,133,310 | 7/1992 | Hitomi et al. | 123/90.16 |
| 5,159,905 | 11/1992 | Sugiuchi et al. | 123/90.16 |
| 5,224,460 | 7/1993 | Havstad et al. | 123/568 |
| 5,230,320 | 7/1993 | Hitomi et al. | 123/559.1 |
| 5,275,137 | 1/1994 | Uesugi | 123/90.16 |
| 5,293,741 | 3/1994 | Kashiyama et al. | 123/90.15 |
| 5,301,636 | 4/1994 | Nakamura | 123/90.16 |

FOREIGN PATENT DOCUMENTS 59-103910  6/1984  Japan .
1-159431   6/1989  Japan .

*Primary Examiner*—Weilun Lo
*Attorney, Agent, or Firm*—Foley & Lardner

[57] ABSTRACT

An apparatus for operating an intake valve and an exhaust valve of an internal combustion engine. The apparatus including a sensor for generating an output for distinguishing an engine operation under a cold condition from other engine operations, and an intake valve gear for the intake valve which incorporates an intake variable valve timing mechanism. The apparatus also includes an exhaust valve gear for the exhaust valve which incorporates an exhaust variable valve timing mechanism. A control unit is provided, which is operatively responsive to the output of the sensor, to condition the exhaust variable valve timing mechanism for providing an advanced closing timing of the exhaust valve before a top dead center of an engine piston stroke, and at the same time, condition the intake variable valve timing mechanism for providing an advanced opening timing of the intake valve, which is disposed before the top dead center of the engine piston stroke, to provide a predetermined valve overlap between the exhaust and intake valves, whereby hydrocarbon emission via the exhaust valve is reduced remarkably without deteriorating stable operation of the engine.

3 Claims, 11 Drawing Sheets

INTAKE AND EXHAUST VALVES CONTROL OF INTERNAL COMBUSTION ENGINE

BACKGROUND OF THE INVENTION

The present invention relates to intake and exhaust valves control of an internal combustion engine.

Various attemps have been made to improve performance of an internal combustion engine.

Japanese Patent Application First Publication No. 59-103910 discloses an apparatus for operating intake and exhaust valves of an internal combustion engine, which is adapted to increase a valve overlap by controlling opening and closing timings of the intake valve during an engine operation under cold condition.

Japanese Patent Application First Publication No. 1-159431 discloses an apparatus for operating intake and exhaust valves of an internal combustion engine, which is adapted to retard an opening timing of the exhaust valve after a bottom dead center of the piston exhaust stroke during an engine operation under cold condition.

An object of the present invention is to achieve a reduction in hydrocarbon (HC) emission during the engine operation under cold condition.

SUMMARY OF THE INVENTION

According to one aspect of the present invention, there is provided an apparatus for operating an intake valve and an exhaust valve of an internal combustion engine, the apparatus comprising:

sensing means for generating an output distinguishing an engine operation under cold condition from other engine operations;

an intake valve gear for the intake valve, the intake valve gear incorporating an intake variable valve timing mechanism;

an exhaust valve gear for the exhaust valve, the exhaust valve gear incorporating an exhaust variable valve timing mechanism; and means operatively responsive to the output of the sensing means to condition the exhaust variable valve timing mechanism for providing an advanced closing timing of the exhaust valve before a top dead center of an engine piston stroke, and at the same time condition the intake variable valve timing mechanism for providing an advanced opening timing of the intake valve which is disposed before the top dead center of the engine piston stroke to provide a predetermined valve overlap between the exhaust and intake valves, whereby hydrocarbon (HC) emission via the exhaust valve is reduced remarkably without deteriorating stable operation of the engine.

According to further aspect of the present invention, there is provided an apparatus for operating an intake valve and an exhaust valve of an internal combustion engine, the apparatus comprising:

sensing means for generating an output distinguishing an engine operation under cold condition from other engine operations;

an intake valve gear for the intake valve, the intake valve gear incorporating an intake variable valve timing mechanism;

an exhaust valve gear for the exhaust valve, the exhaust valve gear incorporating an exhaust variable valve timing mechanism; and means operatively responsive to the output of the sensing means to condition the exhaust variable valve timing mechanism for decreasing an opening duration of the exhaust valve to provide a retarded opening timing thereof and an advanced closing timing thereof, and at the same time condition the intake variable valve timing mechanism for providing advanced opening and closing timings of the intake valve.

According to still further aspect of the present invention, there is provided an apparatus for operating an intake valve and an exhaust valve of an internal combustion engine, the apparatus comprising:

an intake valve gear for the intake valve, the intake valve gear incorporating an intake variable valve timing mechanism, the intake variable valve timing mechanism being operative to move opening and closing timings of the intake valve with an opening duration of the intake valve unaltered; and an exhaust valve gear for the exhaust valve, the exhaust valve gear incorporating an exhaust variable valve timing mechanism, the exhaust variable valve timing mechanism being operative to alter an opening duration of the exhaust valve.

According to still further aspect of the present invention, there is provided an apparatus for operating an intake valve and an exhaust valve of an internal combustion engine, the apparatus comprising:

sensing means for generating an output distinguishing an engine operation under cold condition from the other engine operations;

an intake valve gear for the intake valve, the intake valve gear incorporating an intake variable valve timing mechanism, the intake variable valve timing mechanism being operative to move opening and closing timings of the intake valve with an opening duration of the intake valve unaltered;

an exhaust valve gear for the exhaust valve, the exhaust valve gear incorporating an exhaust variable valve timing mechanism, the exhaust variable valve timing being operative to alter an opening duration of the exhaust valve; and means operative responsive to the output of the sensing means to condition the exhaust variable valve timing mechanism for decreasing an opening duration of the exhaust valve to provide a retarded opening timing thereof and an advanced closing timing thereof, and at the same time condition the intake variable valve timing mechanism for advancing the opening and closing timings of the intake valve.

According to another aspect of the present invention, there is provided a method of operating an intake valve and an exhaust valve of an internal combustion engine, the method comprising the steps of:

generating an output distinguishing an engine operation under a cold condition from other engine operations;

providing, responsive to the output, an advanced closing timing of the exhaust valve before a top dead center of an engine piston stroke; and providing, responsive to the output, an advanced opening timing of the intake valve which is disposed before the top dead center of the engine piston stroke to provide a predetermined valve overlap between the exhaust and intake valves.

According to further aspect of the present invention, there is provided a method of operating an intake valve and an exhaust valve of an internal combustion engine, the method comprising the steps of:

generating an output distinguishing an engine operation under a cold condition from other engine operations;

closing, responsive to the output, the exhaust valve at an advanced closing timing before a top dead center of an engine piston stroke; and opening, responsive to the output, the intake valve at an advanced opening timing which is disposed before the top dead center of the engine piston stroke to provide a predetermined valve overlap between the exhaust and intake valves.

DESCRIPTION OF THE PREFERRED EMBODIMENT

Figure 1:
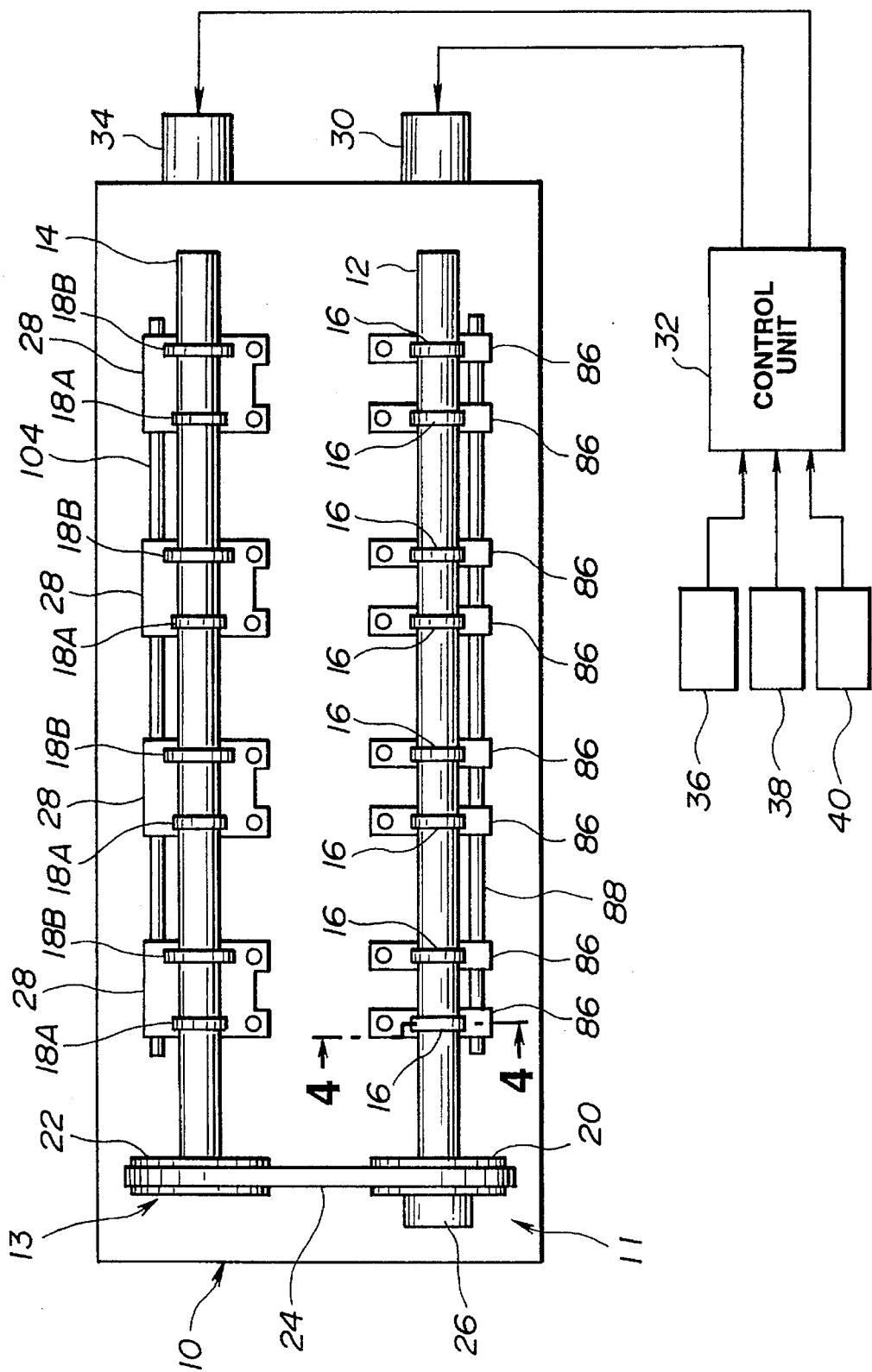
FIG. 1 is a schematic plan view of one preferred embodiment of an apparatus for operating an intake valve and an exhaust valve of an internal combustion engine, according to the present invention.

Referring now to the drawings, the preferred embodiment of an apparatus for operating an intake valve and an exhaust valve of an internal combustion engine, according to the invention is described. The apparatus may be applied to an internal combustion engine of the double overhead cam type.

Figure 4:
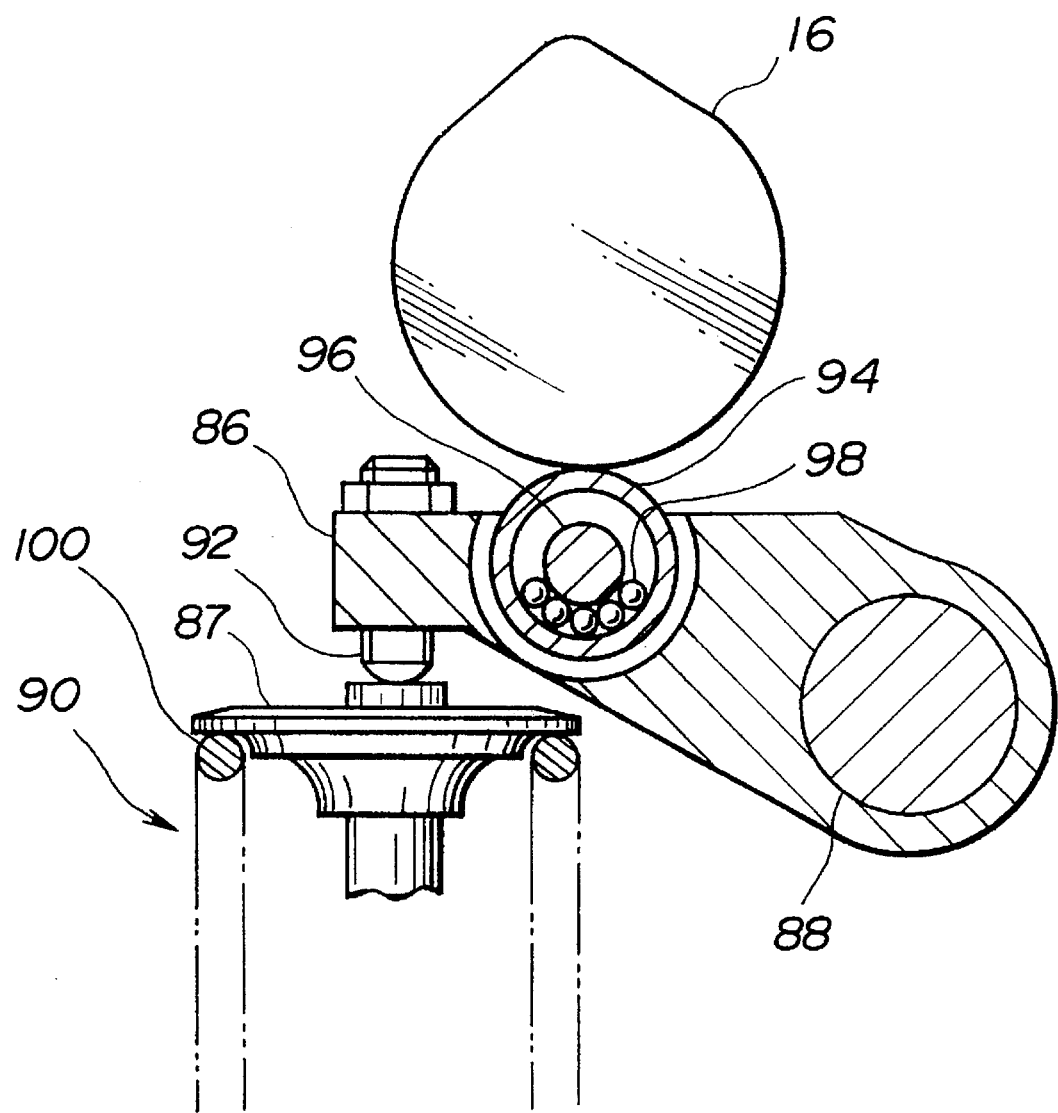
FIG. 4 is an enlarged section showing an intake cam and an intake valve operatively connected.
Figure 6:
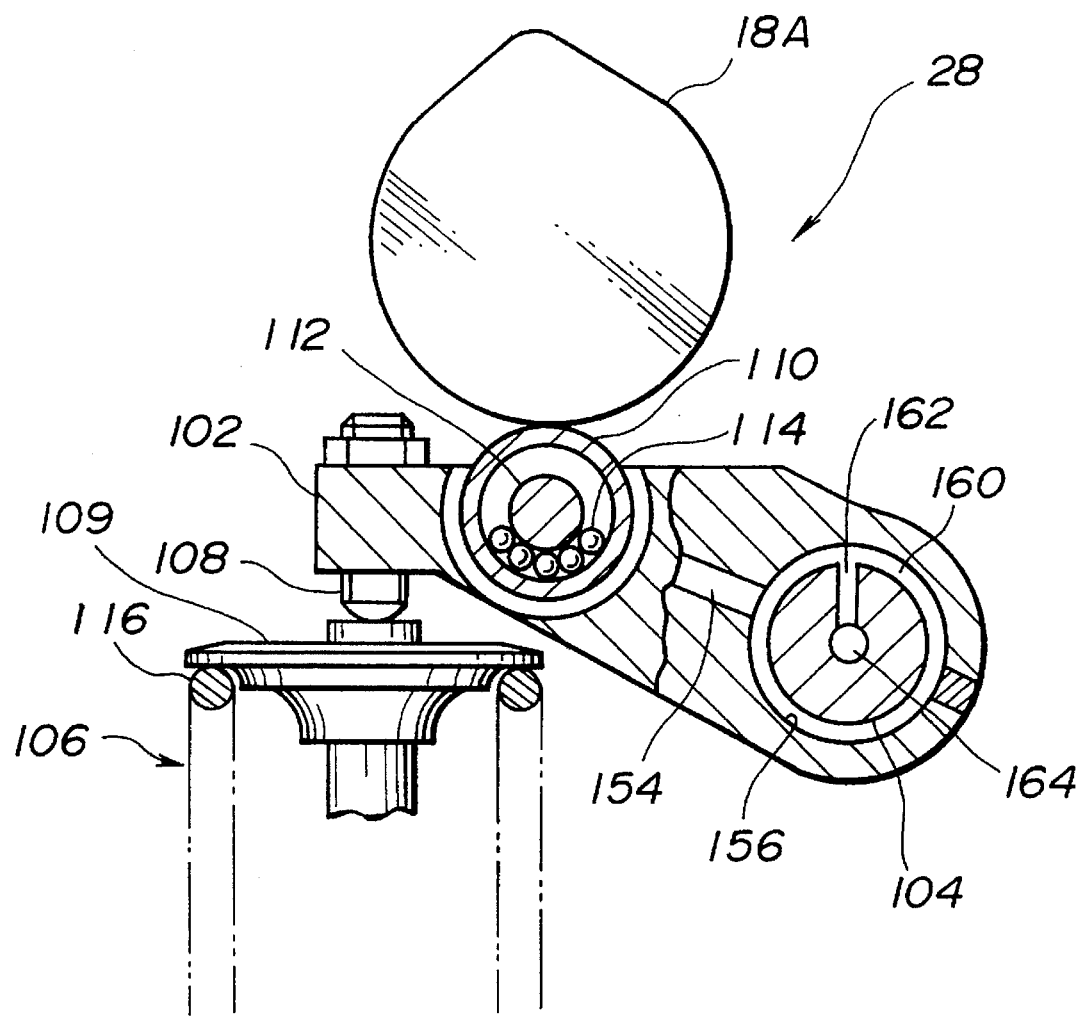
FIG. 6 is an enlarged sectional view taken along the line 6—6 of FIG. 5.
Figure 7:
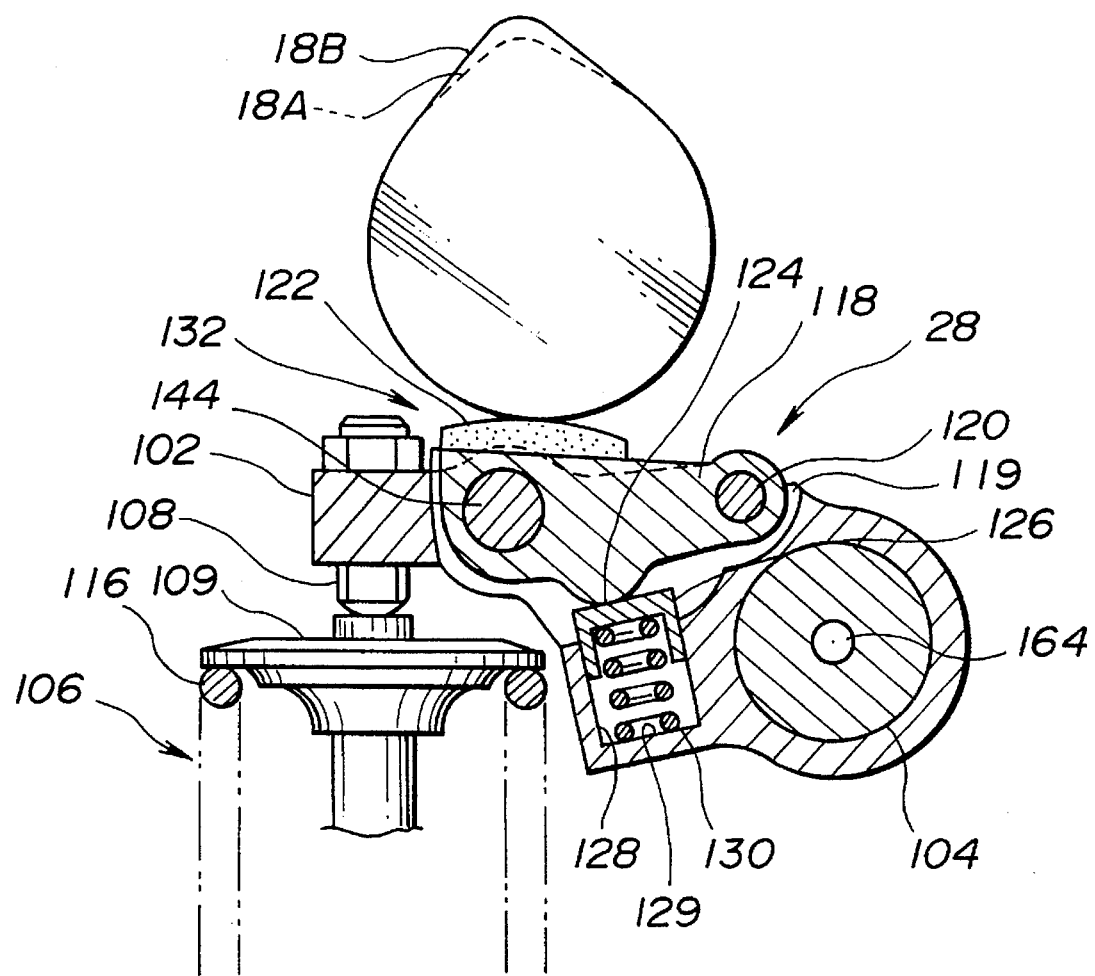
FIG. 7 is an enlarged sectional view taken along the line 7—7 of FIG. 5.
Figure 10:
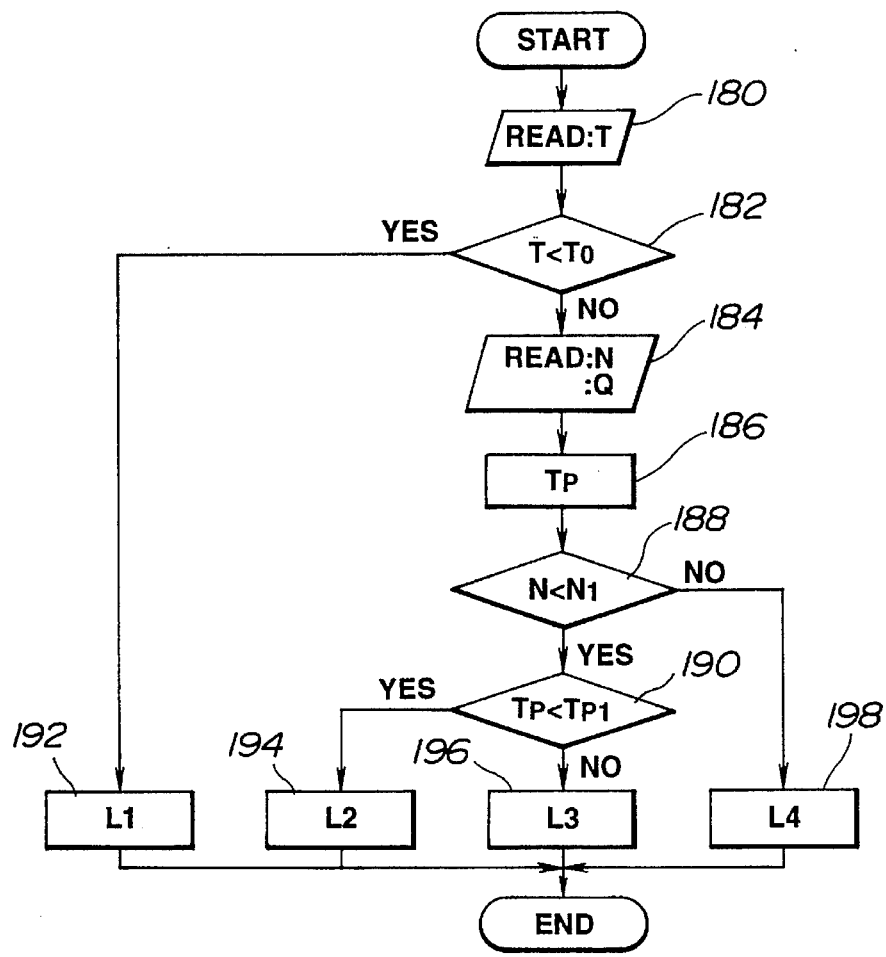
FIG. 10 is a flow diagram illustrating job procedure performed in an operation of the intake and exhaust valves.

As illustrated in FIG. 1, the apparatus 10 comprises an intake valve gear 11 for an intake valve as indicated at numeral 90 in FIG. 4 and an exhaust valve gear 13 for an exhaust valve 106 as indicated at numeral 106 in FIGS. 6 and 7. The intake valve gear 11 includes an intake camshaft 12 and the exhaust valve gear 13 includes an exhaust camshaft 14 disposed substantially parallel to the intake camshaft 12. The intake camshaft 12 has four pairs of intake cams 16 in axially spaced relation and the exhaust camshaft 14 has four pairs of first and second exhaust cams 18A and 18B in axially spaced relation. Each pair of the intake cams 16 and exhaust cams 18A and 18B are disposed corresponding to each cylinder of the engine. The intake camshaft 12 has one end coupled with an intake cam pulley 20 and the other end supported on the body 10. Similarly, the exhaust camshaft 14 is coupled with an exhaust cam pulley 22 at one end thereof and supported on the body 10 at the other end thereof. The intake and exhaust cam pulleys 20 and 22 carry a timing belt 24 through which the intake and exhaust camshafts 12 and 14 are connected with a crankshaft (not shown). The intake valve gear 11 incorporates an intake variable valve timing mechanism 26 disposed at the end of the intake camshaft 12 with which the timing pulley 20 is coupled. The exhaust valve gear 13 incorporates an exhaust variable valve timing mechanism 28 which is disposed below the exhaust camshaft 14, and corresponds to each pair of the first and second exhaust cams 18A and 18B. The intake variable valve timing mechanism 26 is operatively connected through a first hydraulic pressure control valve 30 to a control unit 32 and the exhaust variable valve timing mechanism 28 is connected through a second hydraulic pressure control valve 34 to the control unit 32. The first and second hydraulic pressure control valves 30 and 34 are of normally open solenoid operated type. A coolant temperature sensor 36, a crankangle sensor 38 and an intake airflow meter 40 are also connected to the control unit 32. The control unit 32 is of the microcomputer based control module including as usual a central processor unit (CPU), a read only memory (ROM), a random access memory (RAM), an input interface and an output interface. The control unit 32 recognizes operating conditions under which the engine is operating by reading sensor output signals from the coolant temperature sensor 36, crankangle sensor 38 and intake airflow meter 40. The coolant temperature sensor 36 generates a coolant temperature value signal T for distinguishing an engine operation under cold condition from other engine operating conditions. The crankangle sensor 38 generates an engine speed signal N and the intake airflow meter 40 generates an intake airflow rate signal Q. The control unit 32 processes the information derived from reading operations of the coolant temperature value signal T, engine speed signal N, and intake airflow rate signal Q to generate output signals to be supplied to the first and second hydraulic pressure control valves 30 and 34 for controlling the intake variable valve timing mechanism 26 and exhaust variable valve timing mechanism 28. This control process will be specifically explained later along with a flow diagram as shown in FIG. 10, which illustrates a control program stored in the ROM.

Figure 2:
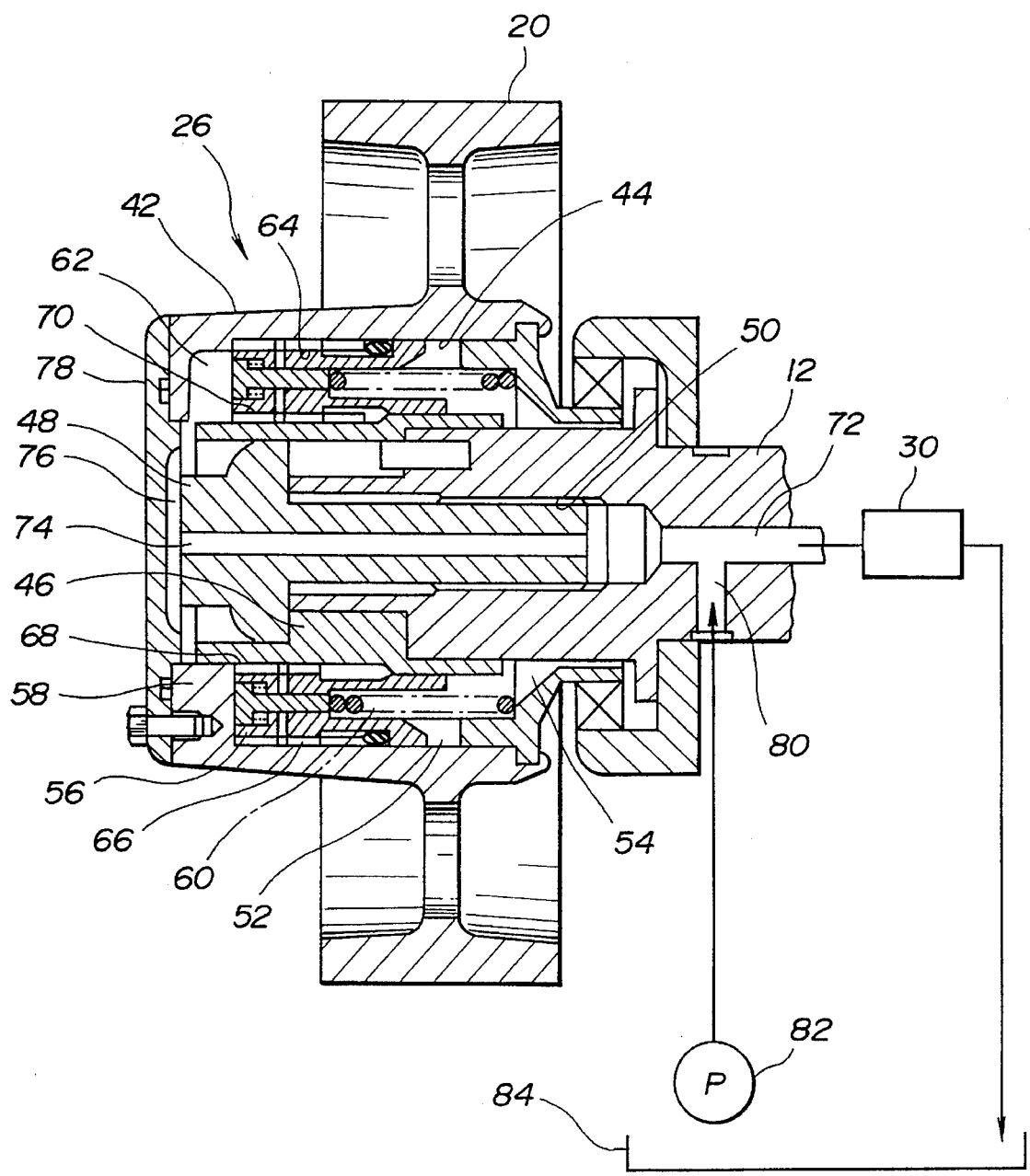
FIG. 2 is a diagram showing an enlarged section of an intake variable valve timing mechanism of the apparatus of FIG. 1, which is placed in an operational state.
Figure 3:
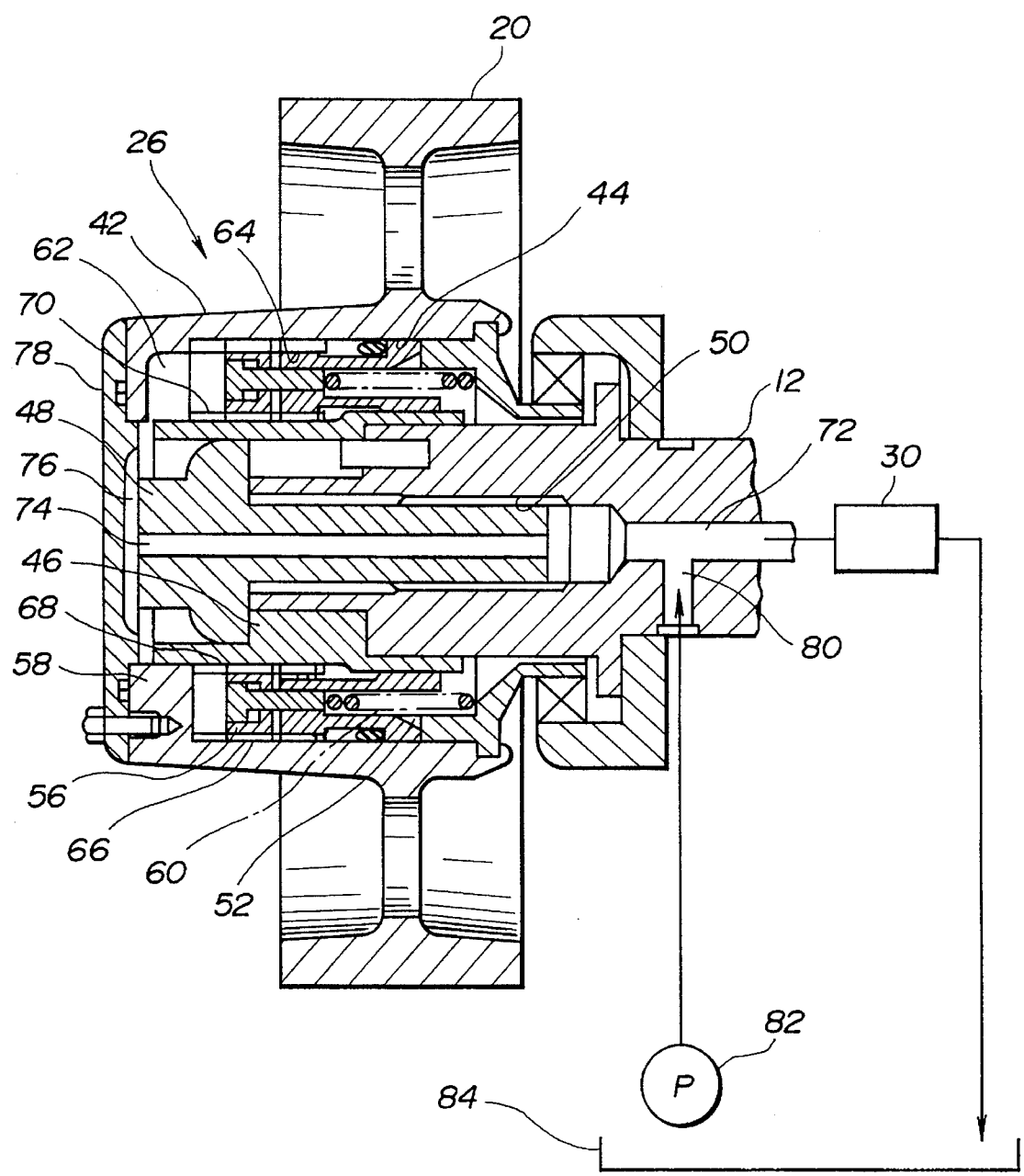
FIG. 3 is a diagram similar to FIG. 2 but showing an operational state different from FIG. 2.

As shown in FIG. 2, the intake variable valve timing mechanism 26 includes a hub 42 of the intake cam pulley 20 which has a cylindrical wall 44. Rotatably disposed in the hub 42 is a sleeve 46 fixedly attached to the intake camshaft 12 by a fastening bolt 48. The bolt 48 is received in a bore section 50 formed in the intake camshaft 12. The sleeve 46 is radially spaced from the cylindrical wall 44 to define therebetween an annular bore 52. The sleeve 46 includes a radial outward extension 54 closing one end of the annular bore 52. An annular piston 56 is disposed in the annular bore 52. The opposite end of the annular bore 52 is closed by a radial inward flange 58 of the hub 42. A piston return spring 60 is disposed in the annular bore 52 between the radial outward extension 54 and the adjacent end of the annular piston 56. The piston return spring 60 biases the annular piston 56 toward the radial inward flange 58 and causes the annular piston 56 to assume a first or spring set position thereof as illustrated in FIG. 2. The annular piston 56 has an axial end opposed to the radial inward flange 58. A hydraulic pressure chamber 62 is defined within the annular bore 52 between the axial end and the radial inward flange 58 of the hub 42. In operation, the annular piston 56 is urged against the piston return spring 60 to move toward the radial outward extension 54 in response to a pressure build-up in the pressure chamber 62 until it assumes a second position thereof as illustrated in FIG. 3.

In order to cause an angular displacement of the sleeve 46 secured to the intake camshaft 12 relative to the intake cam pulley 20, the cylindrical wall 44 is formed with a helical gear 64 engaging a mating helical gear 66, which is formed on the outer peripheral wall of the annular piston 56. The inner peripheral wall of the annular piston 56 is formed with a helical gear 68 engaging a helical gear 70, which is formed on the outer peripheral wall of the sleeve 46. Owing to the helical gear arrangement, movement of the annular piston 56 from the first position as illustrated in FIG. 2 to the second position as illustrated in FIG. 3 causes the sleeve 46, and thus the intake camshaft 12, to displace angularly relative to the intake cam pulley 20 by a predetermined angle, for instance approximately ten degrees. Reverse movement of the annular piston 56 from the second position to the first position thereof causes the sleeve 46 and the intake camshaft 12 to angularly displace relative to the cam pulley 20 in the reverse direction, whereby the angular displacement of the intake shaft 12 is reduced.

The manner of controlling the pressure within the hydraulic pressure chamber 62 is explained below. As shown in FIGS. 2 and 3, the intake camshaft 12 has an axial fluid passage 72 connected with the bore section 50. The fluid passage 72 is communicated with a through bore 74 formed in the bolt 48 which is received in the bore section 50 of the intake camshaft 12. The through bore 74 is open to a recess 76 that is formed in an inside surface of an end plug 78. The recess 76 of the end plug 78 is communicated with the hydraulic pressure chamber 62. The fluid passage 72 of the intake camshaft 12 is connected via a radial port 80 to an oil pump 82, and is also connected via the first hydraulic pressure control valve 30 to an oil pan 84.

When the first hydraulic pressure control valve 30 is open, hydraulic fluid, under pressure, from the oil pump 82 is recirculated to the oil pan 84 via the radial port 80 of the intake camshaft 12 and the fluid passage 72. This results in a decrease in pressure within the chamber 62. The decrease pressure within the chamber 62 allows the piston 56 to be placed by the biassing force of the return spring 60 in the first position as illustrated in FIG. 2. In this position, angular displacement of the intake camshaft 12 relative to the cam pulley 20 is restricted.

When the control valve 30 is closed, hydraulic fluid filled in the fluid passage 72 is supplied to the chamber 62 via the bore 74 and the recess 76 of the end plug 78. Pressure within the chamber 62 increases causing the piston 56 to move against the return spring 60 from the first position into the second position as illustrated in FIG. 3. This increase pressure within the chamber 62 causes the intake camshaft 12 to angularly displace relative to the cam pulley 20 by the predetermined angle.

In FIG. 4, there is shown a rocker arm 86 pivotally supported at one end thereof on a rocker shaft 88 disposed in parallel to the intake camshaft 12 as illustrated in FIG. 1.

The rocker arm 86 has the other end supporting a tappet screw 92 brought into pressure contact with a valve spring retainer 87 for an intake valve 90. A roller 94 is rotatably mounted in the rocker arm 86 so as to be in contact with the intake cam 16. The intake cam 16 is contoured to have a lobe which provides a predetermined valve opening duration θ and a predetermined valve lift of the intake valve 90, as seen from full line I1 of FIG. 12. A shaft 96 and a needle bearing 98 are associated with the roller 94 to achieve the rotatable mounting of the roller 94 relative to the rocker arm 86. The intake valve 90 is always biased by a return spring 100 mounted between the valve spring retainer 87 and a cylinder block (not shown), in such a direction as to close an intake opening (not shown) which is disposed within a combustion chamber of a cylinder head (not shown).

Figure 5:
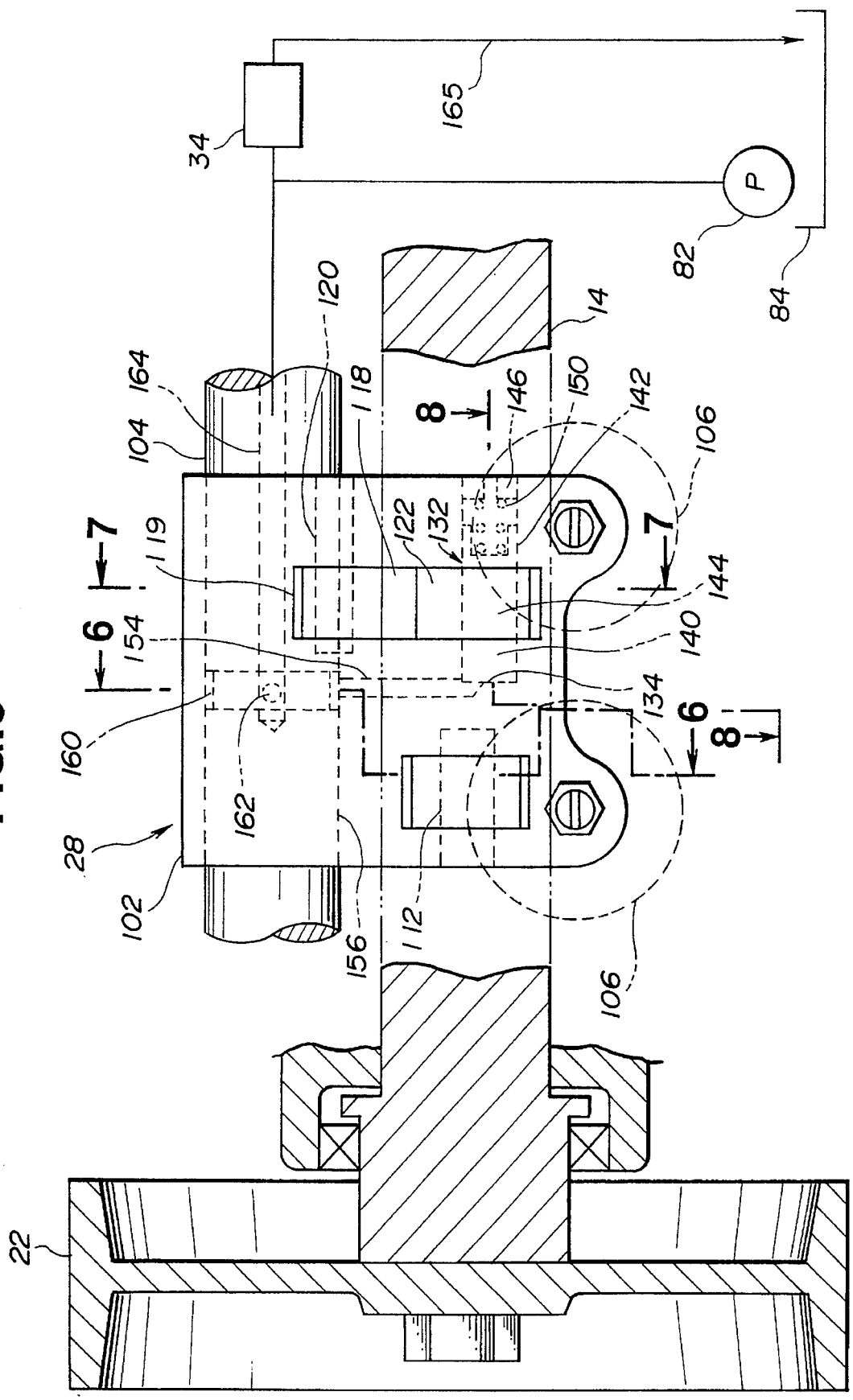
FIG. 5 is a diagram showing an enlarged plan view of an exhaust variable valve timing mechanism of the apparatus of FIG. 1.

Referring to FIGS. 5–9, the exhaust variable valve timing mechanism 28 will be described. As shown in FIGS. 5 and 6, the exhaust variable valve timing mechanism 28 includes a main rocker arm 102 of a generally rectangular shape in a top plan view. The main rocker arm 102 has one end pivotally supported about a main rocker shaft 104 which is disposed in parallel to the exhaust camshaft 14 as illustrated in FIG. 1. The main rocker arm 102 has the other end supporting a tappet screw 108 which contacts a valve spring retainer 109 for an exhaust valve 106. A roller 110 is rotatably mounted in the main rocker arm 102 to contact with the first exhaust cam 18A. The first exhaust cam 18A is contoured to have a lobe which provides a shorter valve opening duration θ1 and reduced valve lift of the exhaust valve 106, as seen from full line E1 of FIG. 12. To facilitate the description of the invention, the first exhaust cam 18A will be hereinafter referred to as a reduced lift cam. A shaft 112 and a needle bearing 114 are associated with the roller 110 to achieve the rotatable mounting of the roller 110 relative to the main rocker arm 102. The exhaust valve 106 is always biased by a return spring 116 mounted between the valve spring retainer 109 and the cylinder block, in such a direction as to close an exhaust opening (not shown) of the combustion chamber.

As shown in FIGS. 5 and 7, a sub-rocker arm 118 is mounted in a slot 119 of the main rocker arm 102 and pivotally supported at one end thereof about a sub-rocker shaft 120 which is held by the main rocker arm 102. As is understood from FIG. 5, axes of the shaft 112 and sub-rocker shaft 120 are parallel to each other. A cam follower 122 is disposed on the sub-rocker arm 118 to contact with the second exhaust cam 18B, as indicated in the full line of FIG. 7. The second exhaust cam 18B is contoured to have a lobe which provides a longer valve opening duration θ2 and increased valve lift of the exhaust valve 106 relative to the reduced lift cam 18A, as seen from broken line E2 of FIG. 12. To facilitate the description of the invention, the second exhaust cam 18B will be hereinafter referred to as an increased lift cam. The sub-rocker arm 118 is formed with a protrudent portion 124 contacting a retainer 126 which is slidably received in a cylindrical groove 128 of the main rocker arm 102. The retainer 126 is biased upward as viewed in FIG. 7, by a return spring 130, which is mounted between a bottom 129 of the groove 128 and the retainer 126. Thus, the retainer 126 urges the protrudent portion 124 of the sub-rocker arm 118 and causes the cam follower 122 to bear against the increased lift cam 18B.

Figure 8:
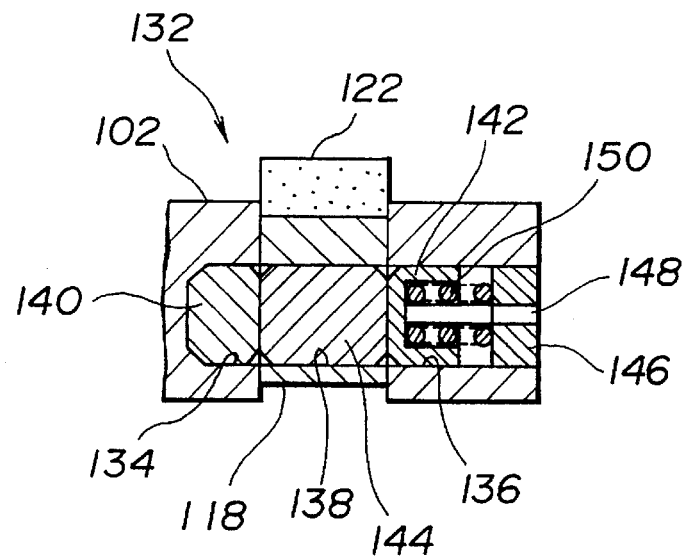
FIG. 8 is a sectional view taken along the line 8—8 of FIG. 5, showing a rocker arm coupling mechanism under an inoperative condition.
Figure 9:
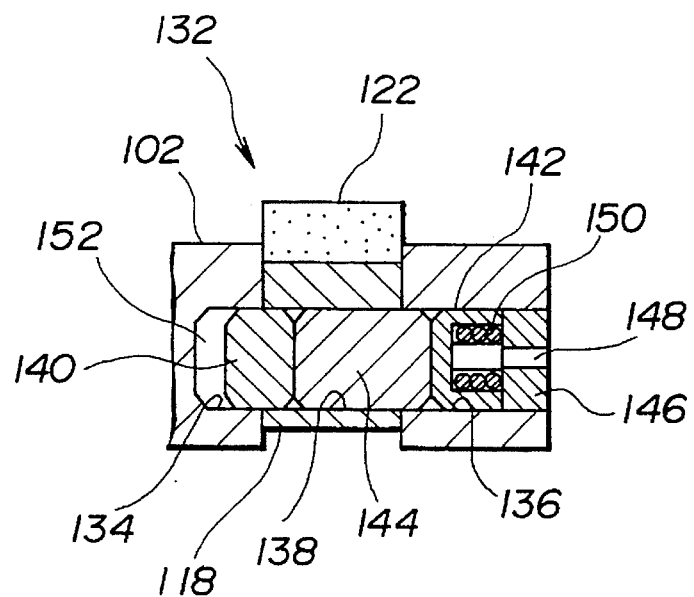
FIG. 9 is a view similar to FIG. 8, but showing the rocker arm coupling mechanism under an operative condition.

For selectively coupling and uncoupling the main rocker arm 102 and the sub-rocker arm 118, there is provided a rocker arm coupling mechanism 132 as illustrated in FIGS. 5, 8 and 9. As shown in FIGS. 8 and 9, the coupling mechanism 132 includes aligned bores 134 and 136 formed in the main rocker arm 102 and a through bore 138 formed in the sub-rocker arm 118. These three bores 134, 136, and 138 are all equal in diameter. The bores 134 and 138 slidably receive solid plungers 140 and 144, respectively, and the bore 136 slidably receives a hollow plunger 142. An end plug 146 is fitted in the bore 136 and has an air passage 148 through which the hollow of the plunger 142 is communicated with the outside air. A return spring 150 is mounted in a clearance defined within the bore 136 between the hollow plunger 142 and the end plug 146. The return spring 150 biases the hollow plunger 142 and the solid plungers 140 and 144 toward the left as viewed in FIG. 8, and causes them to assume first positions thereof, as illustrated in FIG. 8. As shown in FIG. 8, an end of the solid plunger 140 abuts against a wall portion of the main rocker arm 102 which defines the bore 134. In this position, the main rocker arm 102 and the sub-rocker arm 138 are uncoupled. When the plungers 140, 142, and 144 are urged to move against the return spring 150 toward the end plug 146 by a fluid pressure applied to the plunger 140, a chamber 152 is defined within the bore 134 between the wall portion of the main rocker arm 102 and the end of the plunger 140 opposed thereto, as illustrated in FIG. 9. Thus, the plungers 140, 142 and 144 assume second positions thereof, as illustrated in FIG. 9. In the second positions, the main rocker arm 102 and the sub-rocker arm 118 are coupled.

When the sub-rocker arm 118 takes a given angular position relative to the main rocker arm 102, the through bore 138 of the sub-rocker arm 118 is in alignment with the two aligned bores 134 and 136 of the main rocker arm 102. Under this condition, when the plungers 140, 142, and 144 are in the first positions and the main rocker arm 102 and the sub-rocker arm 118 are in the uncoupled condition, the sub-rocker arm 118 is allowed to pivotally move against the return spring 130 in the slot 119 of the main rocker arm 102. Thus, the main rocker arm 102 is operated only by the reduced lift cam 18A without influence of the sub-rocker arm 118.

Under aligned condition of the through bore 138 of the sub-rocker arm 118 and the two bores 134 and 136 of the main rocker arm 102, when the plungers 140, 142, and 144 are in the second positions and the main rocker arm 102 and the sub-rocker arm 118 are in the coupled condition, the main rocker arm 102 and the sub-rocker arm 118 make a unitary motion, and therefore, the main rocker arm 102 is operated by the increased lift cam 18B.

The manner of controlling the fluid pressure applied to the end of the plunger 140 is explained below. As illustrated in FIGS. 5 and 6, an oil passage 154 extends within the main rocker arm 102 to communicate the bore 134 and a bearing bore 156 for the main rocker shaft 104. An annular groove 160 is formed on a peripheral surface of the main rocker shaft 104 to communicate the oil passage 154 and a radial port 162 extending radially and outwardly from an oil gallery 164. The oil gallery 164 axially extends through the main rocker shaft 104 and is connected via the second hydraulic pressure control valve 34 to the oil pump 82.

When the control valve 84 is open, the pressurized hydraulic fluid supplied from the oil pump 82 is recirculated to the oil pan 84 via a recirculating line 165. This causes a reduction of hydraulic pressure within the oil passage 154. The reduced pressure is applied to the end of the plunger 140 and causes the plungers 140, 142, and 144 to move into the first positions, as illustrated in FIG. 8, owing to bias of the return spring 150. The main rocker arm 102 and the sub-rocker arm 138 are in the uncoupled condition, and thus, the main rocker arm 102 is operated by the reduced lift cam 18A.

When the control valve 34 is closed, the pressurized hydraulic fluid from the oil pump 82 flows into the bore 134 via the oil gallery 164, the radial port 162, the annular groove 160 and the oil passage 154. An increased hydraulic pressure in the oil passage 154 is applied to the end of the plunger 140, causing the plungers 140, 142, and 144 to move against bias of the return spring 150 into the second positions, as seen in FIG. 9. Then, the main rocker arm 102 and the sub-rocker arm 118 are in the coupled condition and the main rocker arm 102 is operated by the increased lift cam 18B.

Referring to FIG. 10, an operation of variable valve timing control for the intake and exhaust valves 90 and 106 will now be explained.

Figure 11:
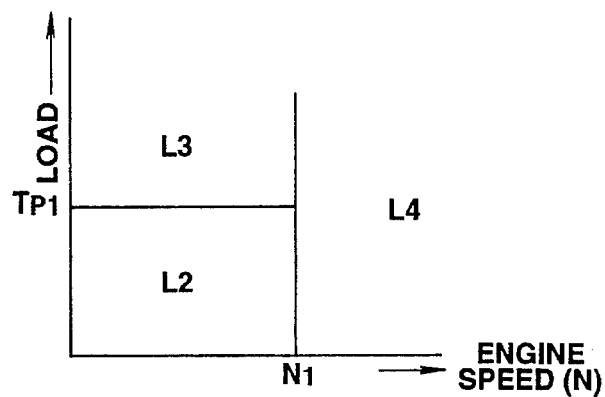
FIG. 11 is a map illustrating various ranges of engine operation.
Figure 13:
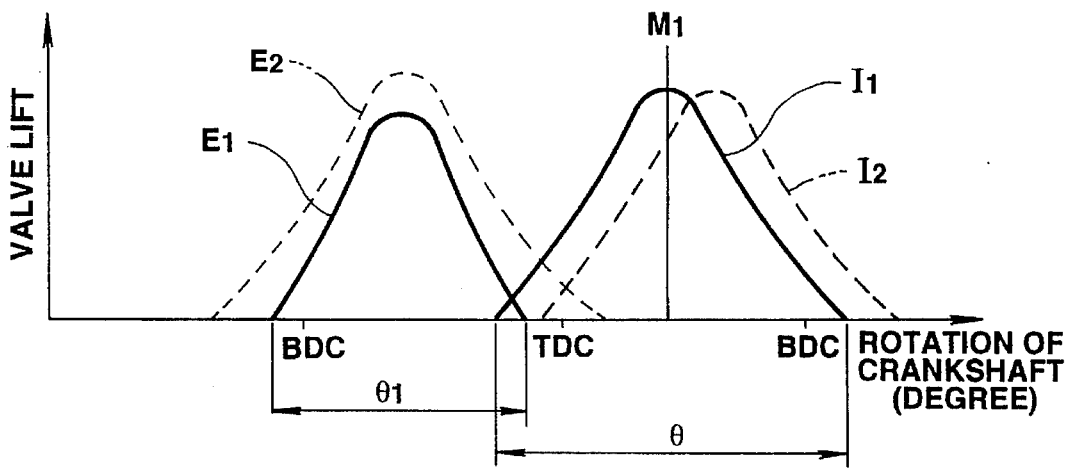
FIG. 13 is a valve timing diagram during an engine operation range under cold condition or an engine operation range at low speed with high load.
Figure 14:
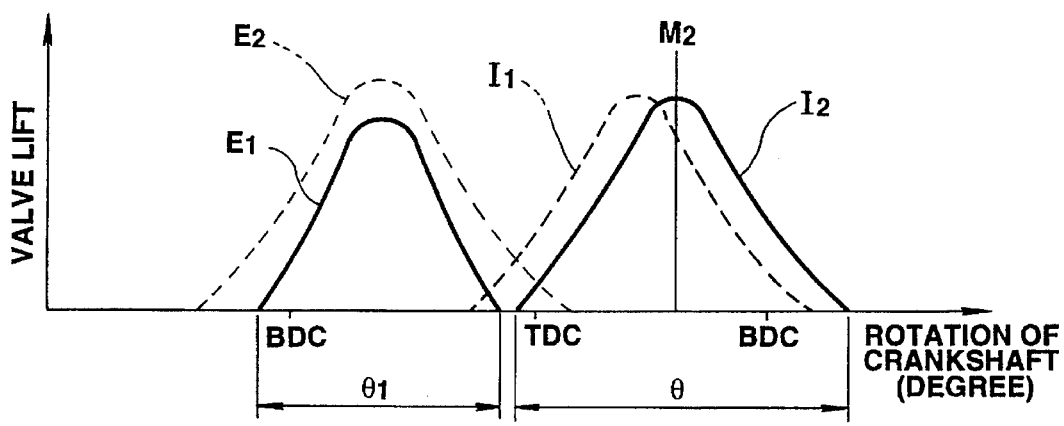
FIG. 14 is a valve timing diagram during an engine operation range at low speed with low load.
Figure 15:
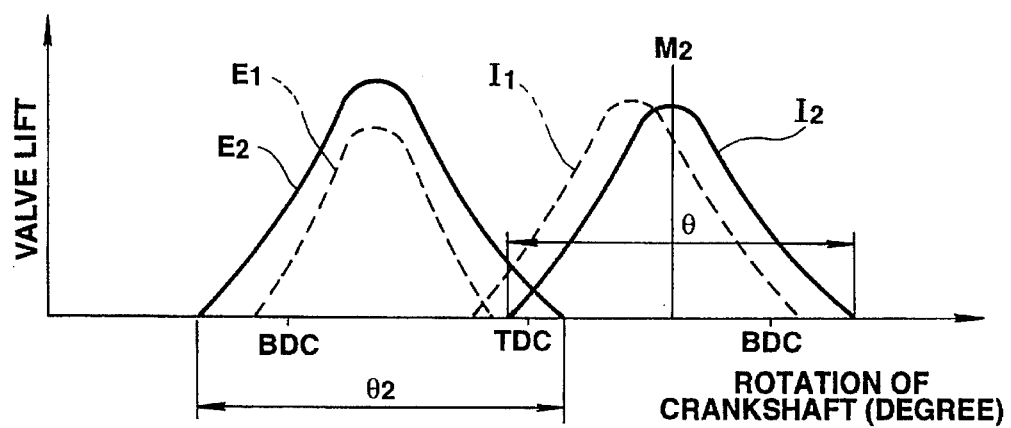
FIG. 15 is a valve timing diagram during an engine operation range at high speed.

As illustrated in FIG. 10, at a step 180, a reading operation of the output from the coolant temperature sensor 36 is performed and the result is stored as a coolant temperature data T. There is an interrogation at a step 182 whether T is less than a predetermined coolant temperature value T0. If the interrogation results in an affirmative response, the routine proceeds to a step 192. At the step 192, an appropriate valve timing for a range L1 is set. The appropriate valve timing is illustrated in FIG. 13. If the interrogation at the step 182 results in a negative response, the routine proceeds to a step 184. At step 184, reading operations of the outputs of the crankangle sensor 36 and intake airflow meter 38 are performed and the results are stored as an engine speed data N and an intake air flow rate data Q. At step 186, a basic fuel amount Tp as expressed by a function of N and Q is determined. There is an interrogation at a step 188 whether N is less than a predetermined engine speed value N1. If this is the case, there is another interrogation at a step 190 whether the basic amount Tp is less than a predetermined reference Tp1. If the interrogation at the step 190 results in an affirmative response, the routine proceeds to a step 194. At the step 194, an appropriate valve timing for a range L2 as illustrated in FIG. 11 is set. The appropriate valve timing for the range L2 is illustrated in FIG. 14. If the interrogation at the step 190 results in a negative response, the routine proceeds to a step 196. At the step 196, an appropriate valve timing for a range L3 as illustrated in FIG. 11 is set. The appropriate valve timing for the range L3 is similar to the valve timing for the range L1 as illustrated in FIG. 13. If the interrogation at the step 188 results in a negative response, the routine proceeds to a step 198. At the step 198, an appropriate valve timing for a range L4 as illustrated in FIG. 11 is set. The appropriate valve timing for the range L4 is illustrated in FIG. 15. The output signals are supplied to the first and second hydraulic pressure control valves 30 and 34 to establish valve timing set at one of the steps 192, 194, 196, and 198. During the range L1, the engine operation is under a cold condition. As illustrated in FIG. 11, the engine operates at low speed with low load during the range L2, at low speed with high load during the range L3, and at high speed during the range L4.

Figure 12:
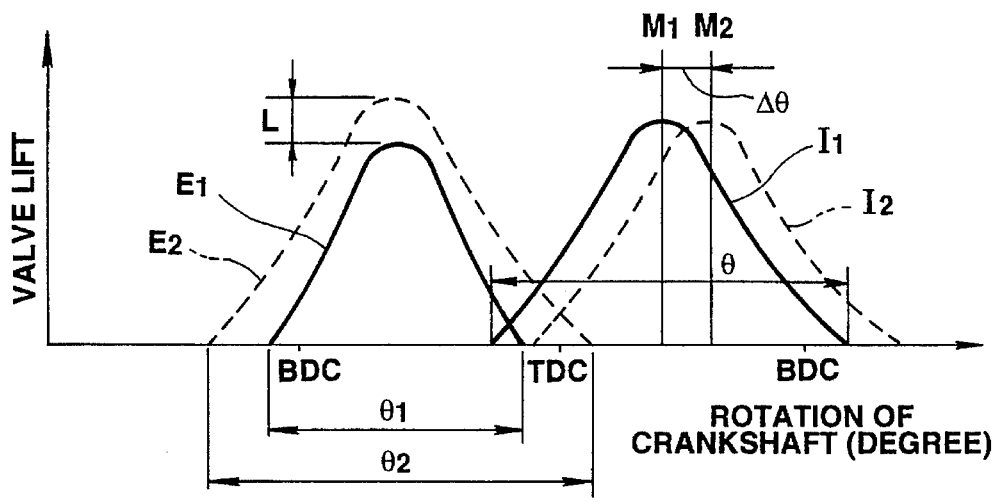
FIG. 12 is a valve timing diagram.

FIG. 12 shows valve timing characteristics of the intake valve 90 and the exhaust valve 106 which are determined in response to shift of the first and second hydraulic pressure control valves 30 and 34. In FIG. 12, the intake valve 90 has a valve timing position I1, as illustrated in full line, when the first hydraulic pressure control valve 30 is OFF, viz. open, and a valve timing position I2 as illustrated in broken line when the first control valve 30 is ON, viz. closed. At both the valve timing positions I1 and I2, the intake valve 90 operates in the predetermined valve opening duration θ with the predetermined valve lift. As shown in FIG. 12, the predetermined valve opening duration θ, however, is displaced by an amount $\Delta\theta$ between the valve timing positions I1 and I2. The amount $\Delta\theta$ indicates the difference between two points M1 and M2 within the predetermined valve opening duration $\theta$, at which points the maximum valve lift is caused. As illustrated in FIG. 12, opening and closing timings of the valve timing position I1 are advanced with respect to those of the valve timing position I2 by the amount $\Delta\theta$. Similarly, the exhaust valve 106 has a valve timing position E1, as illustrated in full line, when the second hydraulic pressure control valve 34 is OFF, viz. open, and a valve timing position E2 as illustrated in broken line when the second control valve 84 is ON, viz. closed. At the valve timing position E1, the exhaust valve 106 operates in the shorter valve opening duration $\theta1$ with the reduced valve lift, when the second control valve 34 is OFF, while, at the valve timing position E2, the exhaust valve operates in the longer valve opening duration $\theta2$ with the increased valve lift, when the second control valve 34 is ON. As seen in FIG. 12, at the valve timing position E1, the exhaust valve 106 has a delayed opening timing with respect to an opening timing at the valve timing position E2 and an advanced closing timing with respect to a closing timing at the valve timing position E2. As illustrated in FIG. 12, the maximum value of the reduced valve lift is less than the maximum value of the increased valve lift by a difference L.

FIGS. 13–15 are now specifically explained for understanding of valve timings of the intake and exhaust valves 90 and 106 during the engine operation ranges L1–L4.

Within the range L1, the first control valve 30 for the intake valve 90 is supplied with OFF signal from the control unit 32, and the second control valve 34 for the exhaust valve 106 is supplied with OFF signal from the control unit 32. The intake variable valve timing mechanism 26 and the exhaust variable valve timing mechanism 28 are conditioned to provide the appropriate valve timings of the intake and exhaust valves 90 and 106, respectively. The appropriate valve timings are placed at the valve timing positions I1 and E1 as illustrated in full lines of FIG. 13. Both opening and closing timings at the valve timing position I1 of the intake valve 90 are disposed before a top dead center (TDC) of the engine piston stroke and advanced with respect to the opening and closing timings at the valve timing position I2 as illustrated in broken line of FIG. 13. At the same time, an opening timing at the valve timing position E1 of the exhaust valve 106 is retarded and a closing timing thereat is advanced with respect to the opening and closing timings at the valve timing position E2 as illustrated in broken line of FIG. 13. The closing timing of the exhaust valve 106 is before the TDC. Owing to the advanced closing timing of the exhaust valve 106 before the TDC and the advanced opening timing of the intake valve 90, an exhaust line (not shown) is closed before the TDC and there is provided a predetermined valve overlap as shown in FIG. 13, between the intake and exhaust valves 90 and 106. The retarded opening timing of the exhaust valve 106 prevents the exhaust gas from entering the exhaust line until combustion within the combustion chamber is fully performed. This prevents an unburned HC within the combustion chamber from entering the exhaust line together with the exhaust gas. The advanced closing timing of the exhaust valve 106 prevents the unburned HC remaining in a piston clevis of a piston head from rushing into the exhaust line immediately before the exhaust valve 106 closes at approximately the TDC. Owing to the advanced opening timing of the intake valve 90, the unburned HC in the piston clevis is drawn into an intake line due to a negative pressure which is built up immediately after the intake valve 90 opens. This serves to prevent the unburned HC from entering the exhaust line. As a result, HC emission via the exhaust valve 106 is reduced remarkably without deteriorating stable operation of the engine. The advanced closing timing of the intake valve 90 allows appropriate mixing of fuel and air for the engine operation with low revolution. This results in an increased charging efficiency and an increased torque at low speed during the engine operation under a cold condition.

Within the range L2, the signal supplied to the first control valve 30 for the intake valve 90 changes from OFF to ON while the signal supplied to the second control valve 34 for the exhaust valve 106 is OFF. The intake variable valve timing mechanism 26 and the exhaust variable valve timing mechanism 28 are conditioned to provide the appropriate valve timings of the intake and exhaust valves 90 and 106, respectively. This causes the valve timings of the intake and exhaust valves 90 and 106 to be placed at the position I2 and E1 as illustrated in full lines of FIG. 14. The opening and closing timings at the position I2 of the intake valve 90 are retarded with respect to the opening and closing timings at the valve timing position I1, respectively. At the position E1, the opening timing of the exhaust valve 106 is retarded and the closing timing is advanced to be disposed before the TDC, with respect to the opening and closing timings at the valve timing position E2. Owing to the retarded opening timing of the intake valve 90 and the advanced closing timing of the exhaust valve 106, the valve overlap decreases to the minimum degree or zero. The decrease in the valve overlap causes a reduction of amount of the exhaust gas remaining in the combustion chamber. This results in a stable combustion and an improved fuel economy during the engine operation range at low speed with low load. The retarded closing timing of the intake valve 90 causes a reduction of pumping loss to thereby improve fuel economy. The retarded opening timing of the exhaust valve 106 promotes conversion of the combustion energy into a rotary energy for the rotation movement of the crankshaft. This allows a reduction of blow down loss, resulting in an improved fuel economy.

When the engine operation shifts from the range L2 to the range L3, the signal supplied to the first control valve 30 for the intake valve 90 changes from ON to OFF while the signal supplied to the second control valve 34 for the exhaust valve 106 is still OFF. The intake variable valve timing mechanism 26 and the exhaust variable valve timing mechanism 28 are conditioned to provide the appropriate valve timings of the intake and exhaust valves 90 and 106, respectively. This causes the valve timing of the intake valve 90 to shift from the position I2 as illustrated in broken line of FIG. 13 to the position I1 as illustrated in full line of FIG. 13. The opening and closing timings at the valve timing position I1 are advanced with respect to the opening and closing timings at the valve timing position I2. The advanced opening and closing timings of the intake valve allows appropriate mixing of fuel and air during the engine operation at low speed, resulting in the increased charging efficiency and increased torque during the low speed range. The valve timing of the exhaust valve 106 is kept at the position E1 drawn by full line of FIG. 13. The opening timing of the exhaust valve 106 is retarded and the closing timing is advanced to be disposed before the TDC. Owing to the advanced opening timing of the intake valve 90 and the advanced closing timing of the exhaust valve 106, there is provided the predetermined valve overlap as shown in FIG. 13, which is suitable for the engine operation at low speed with high load as well as the engine operation under cold condition. The retarded opening timing of the exhaust valve 106 causes the reduction of blow down loss, as described above.

When the engine operation shifts from the range L3 to the range L4, the signal supplied to the first control valve 30 for the intake valve 90 changes from OFF to ON and the signal supplied to the second control valve 34 for the exhaust valve 106 changes from OFF to ON. This causes the valve timing of the intake valve 90 to shift from the position I1 as illustrated in broken line of FIG. 15 to the position I2 as illustrated in full line of FIG. 15 and the valve timing of the exhaust valve 106 to shift from the position E1 as illustrated in broken line of FIG. 15 to the position E2 as illustrated in full line of FIG. 15. The opening and closing timings at the valve timing position I2 are retarded with respect to the opening and closing timings at the valve timing position I1. The opening timing at the valve timing position E2 is advanced and the closing timing thereat is retarded to be disposed after the TDC, with respect to the opening and closing timings at the valve timing position E1. Owing to the delayed opening timing of the intake valve 90 and the delayed closing timing of the exhaust valve 106, an increase in the valve overlap as illustrated in FIG. 15, is obtained, causing an increased scavenging efficiency. The retarded closing timing of the intake valve 90 allows appropriate mixing of fuel and air for the engine operation at high speed. This leads to an enhanced charging efficiency and an increased torque during the engine operation at high speed. Since the exhaust valve 106 operates with the increased valve lift and the longer valve opening duration θ2 due to the advanced opening timing and retarded closing timing, a reduced exhaust resistance is developed in the exhaust opening when the exhaust valve 106 opens. This reduced exhaust resistance allows a smooth discharge of the exhaust gas into the exhaust line, resulting in an increase in torque during the high speed engine operation range L4.

Table 1 shows the aforementioned opening and closing timings of the intake and exhaust valves 90 and 106 during the engine operation ranges L1–L4.

TABLE 1

|  | Intake Valve | | Exhaust Valve | |
| --- | --- | --- | --- | --- |
|  | Opening Timing | Closing Timing | Opening Timing | Closing Timing |
| Engine Operation Range | | | | |
| L1 | Advanced | Advanced | Delayed | Advanced |
| L2 | Delayed | Delayed | Delayed | Advanced |
| L3 | Advanced | Advanced | Delayed | Advanced |
| L4 | Delayed | Delayed | Advanced | Delayed |

As is appreciated from the above description, the intake variable valve timing mechanism 26 is operated to move the opening and closing timings of the intake valve 90 with the opening duration of the intake valve 90 unaltered, and the exhaust variable valve timing mechanism 28 is operated to alter the opening duration of the exhaust valve 106. Namely, during engine operation under cold condition, the intake variable valve timing mechanism 26 allows an advance of the opening and closing timings, and the exhaust variable valve timing mechanism 28 allows a decrease in the opening duration of the exhaust valve 106 to provide the retarded opening timing thereof during the engine operation under a cold condition.

Since the hydraulic pressure control valves 30 and 34 are of a normally open type, the control valves 30 and 34 serve for quick movements of the intake variable valve timing mechanism 26 and exhaust variable valve timing mechanism 28 in response to starting from the engine operation under cold condition. This promotes suction of the unburned HC into the intake line to thereby prevent discharging of the unburned HC into the exhaust line, serving for reduction of the HC emission.

An exhaust gas temperature sensor detecting temperature of the exhaust gas may be used for distinguishing the engine operation under condition from other engine operations, instead of the coolant temperature sensor 36.

What is claimed is:

1. An apparatus for operating an intake valve and an exhaust valve of an internal combustion engine, the apparatus comprising:

sensing means for generating an output distinguishing an engine operation under a cold condition from other engine operations;

an intake valve gear for the intake valve, said intake valve gear incorporating an intake variable valve timing mechanism;

an exhaust valve gear for the exhaust valve, said exhaust valve gear incorporating an exhaust variable valve timing mechanism; and means operatively responsive to said output of said sensing means to condition said exhaust variable valve timing mechanism for providing an advanced closing timing of the exhaust valve before a top dead center of an engine piston stroke, and at the same time condition said intake variable valve timing mechanism for providing an advanced opening timing of the intake valve which is disposed before the top dead center of the engine piston stroke to provide a predetermined valve overlap between the exhaust and intake valves, whereby hydrocarbon emission via the exhaust valve is reduced remarkably without deteriorating stable operation of the engine.

2. A method of operating an intake valve and an exhaust valve of an internal combustion engine, the method comprising the steps of:

generating an output distinguishing an engine operation under a cold condition from other engine operations:

providing, responsive to said output, an advanced closing timing of the exhaust valve before a top dead center of an engine piston stroke; and providing, responsive to said output, an advanced opening timing of the intake valve which is disposed before the top dead center of the engine piston stroke to provide a predetermined valve overlap between the exhaust and intake valves.

3. A method of operating an intake valve and an exhaust valve of an internal combustion engine, the method comprising the steps of:

generating an output distinguishing an engine operation under a cold condition from other engine operations;

closing, responsive to said output, the exhaust valve at an advanced closing timing before a top dead center of an engine piston stroke; and opening, responsive to said output, the intake valve at an advanced opening timing which is disposed before the top dead center of the engine piston stroke to provide a predetermined valve overlap between the exhaust and intake valves.

\* \* \* \* \*